(12) United States Patent
Emond et al.

(10) Patent No.: US 9,449,266 B2
(45) Date of Patent: Sep. 20, 2016

(54) METHOD AND APPARATUS FOR TRACKING TRANSPORTED ITEMS USING RFID TAGS

(75) Inventors: Jean-Pierre Emond, Gainesville, FL (US); Dilek Dagdelen Uysal, Lakeland, FL (US); Jeffrey Lane Wells, Plant City, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 850 days.

(21) Appl. No.: 12/593,934

(22) PCT Filed: Mar. 31, 2008

(86) PCT No.: PCT/US2008/058939
§ 371 (c)(1),
(2), (4) Date: Apr. 19, 2010

(87) PCT Pub. No.: WO2008/121981
PCT Pub. Date: Oct. 9, 2008

(65) Prior Publication Data
US 2010/0213086 A1    Aug. 26, 2010

Related U.S. Application Data

(60) Provisional application No. 60/921,338, filed on Mar. 30, 2007.

(51) Int. Cl.
*G08B 13/14* (2006.01)
*G06K 19/073* (2006.01)
*G06K 7/10* (2006.01)

(52) U.S. Cl.
CPC ..... *G06K 19/07327* (2013.01); *G06K 7/10178* (2013.01)

(58) Field of Classification Search
CPC ............. G06K 19/07327; G06K 7/10178; H05K 9/00
USPC ....... 206/524, 524.1, 484, 560.01, 503, 504, 206/508, 775–783; 174/380; 340/572.7, 340/572.8; 343/872, 841
See application file for complete search history.

(56) References Cited

U.S. PATENT DOCUMENTS 1,352,016 A     9/1920  Mix
1,438,181 A  *  12/1922  Klopf ........................ 206/424
(Continued)

FOREIGN PATENT DOCUMENTS

CA    2518379    3/2006
DE    10220502    11/2003
(Continued)

OTHER PUBLICATIONS

Ukkonen, L., et al., "Reliability of Passive RFID of Multiple Objects Using Folded Microstrip Patch-Type Tag Antenna," *Antennas and Propagation Society International Symposium*, Jul. 3-8, 2005, pp. 341-344, vol. 2B, IEEE.
(Continued)

*Primary Examiner* — Chun Cheung
(74) *Attorney, Agent, or Firm* — Saliwanchik, Lloyd & Eisenschenk (57) ABSTRACT

A method and apparatus for tracking transported items using RFID tags are provided. A tote for transporting RFID tagged items includes a body capable of enclosing one or more RFID tagged items. RF reflective and/or absorbent material is positioned to inhibit RF signals from reaching the enclosed RFID tagged items from outside the body. A portion of a wall of the tote or a sleeve for insertion into the tote can be free of reflective and/or absorbent material to allow RF signals to be sent into, and exit, the tote. The RF reflective and/or absorbent material can be provided with or without texture.

82 Claims, 6 Drawing Sheets

(56) References Cited

U.S. PATENT DOCUMENTS

| | | | |
|---|---|---|---|
| 4,480,747 A * | 11/1984 | Kazor et al. ................. 206/721 |
| 4,528,222 A * | 7/1985 | Rzepecki et al. .......... 206/524.3 |
| 4,792,042 A * | 12/1988 | Koehn et al. ................. 206/709 |
| 4,966,280 A * | 10/1990 | Bradford ....................... 206/721 |
| 5,270,901 A * | 12/1993 | Nowak et al. ................. 361/212 |
| 5,895,540 A * | 4/1999 | David et al. ................... 206/386 |
| 5,920,287 A | 7/1999 | Belcher et al. |
| 6,232,870 B1 * | 5/2001 | Garber ................. G06K 7/0008 235/385 |
| 6,335,685 B1 | 1/2002 | Schrott et al. |
| 6,520,544 B1 | 2/2003 | Mitchell et al. |
| 6,724,308 B2 | 4/2004 | Nicholson |
| 6,859,745 B2 | 2/2005 | Carr et al. |
| 6,861,954 B2 | 3/2005 | Levin |
| 6,901,304 B2 | 5/2005 | Swan et al. |
| 6,914,562 B2 | 7/2005 | Forster |
| 7,034,689 B2 | 4/2006 | Teplitxky et al. |
| 7,049,963 B2 | 5/2006 | Waterhouse et al. |
| 7,053,775 B2 | 5/2006 | Moore |
| 7,088,249 B2 * | 8/2006 | Senba et al. ................ 340/572.8 |
| 7,924,157 B2 * | 4/2011 | Weller et al. .............. 340/572.1 |
| 2002/0067267 A1 | 6/2002 | Kirkham |
| 2004/0233065 A1 | 11/2004 | Freeman |
| 2005/0040952 A1 | 2/2005 | Dearing et al. |
| 2005/0043850 A1 | 2/2005 | Stevens et al. |
| 2006/0109105 A1 | 5/2006 | Varner et al. |
| 2006/0128023 A1 | 6/2006 | Waterhouse et al. |
| 2006/0145856 A1 | 7/2006 | Tethrake et al. |
| 2006/0187061 A1 * | 8/2006 | Colby ........................ 340/572.8 |
| 2006/0254815 A1 * | 11/2006 | Humphrey et al. .......... 174/380 |
| 2007/0164107 A1 * | 7/2007 | Oishi et al. ................... 235/385 |

FOREIGN PATENT DOCUMENTS

| | | |
|---|---|---|
| EP | 361-539 | 11/2003 |
| WO | WO-2005-093456 | 10/2005 |
| WO | WO-2006-116588 | 11/2006 |

OTHER PUBLICATIONS

Unknown, "EPCglobal Conference Provides Latest on RFID," *Pharmaceutical and Medical Packaging News*, Dec. 2004.

Unknown, "Readin', Writin' and RFID" *Assembly*, Oct. 2001, pp. 60-62, vol. 44, No. 11.

Unknown, "RFID," Trivalent Solutions, Inc., www.trivalentsolutions.com/solutions.php.

* cited by examiner

METHOD AND APPARATUS FOR TRACKING TRANSPORTED ITEMS USING RFID TAGS

CROSS-REFERENCE TO RELATED APPLICATIONS

The present application is the U.S. National Stage Application of International Patent Application No. PCT/US2008/058939, filed Mar. 31, 2008, which claims the benefit of U.S. Application Ser. No. 60/921,338, filed Mar. 30, 2007, both of which are hereby incorporated by reference herein in their entirety, including any figures, tables, or drawings.

BACKGROUND OF INVENTION

It is often desirable to track the transport of items between locations, such as the point of manufacture and the point of sale or use. In particular, the secure transport of pharmaceutical products between production facilities, distribution centers, and/or pharmacies is important. The use of RFID tags in close proximity to each other can introduce additional costs and/or errors into the process of tracking a multiplicity of separately RFID tagged items. Also, it can be difficult to read all the RFID tags placed individually on a large number of items placed in close proximity to each other. Further, it is often desirable to prevent others from reading the RFID tags of tagged items being transported.

There is a need for a method and system for using RFID tags to accurately identify items being transported between various locations, such that RFID tags can be read and distinguished for a plurality of RFID tagged items proximate each other. There is also a need to prevent the reading by others of RFID tagged items being transported in certain situations.

BRIEF SUMMARY

Embodiments of the invention relate to a method and apparatus for tracking transported items using RFID tags. Embodiments of the invention pertain to a tote, and/or a sleeve for use with a tote, for storing and/or transporting items tagged with RFID tags. In an embodiment, a tote for shipment of items that are tagged with RFID tags, such as pharmaceutical products, can be utilized. Embodiments of the subject invention provide a secure way of transporting pharmaceutical products, or other items, between distribution centers and pharmacies using RFID tags and RFID readers. Using material that is at least partially reflective and/or at least partially absorbent to RF signals on one or more of the six walls of the tote, it is possible to increase the readability of RFID tags inside the tote. A portion of the six walls of the tote can be free of reflective and/or absorbent material to allow RF signals to be sent into, and exit, the tote. Specific embodiments incorporate RF reflective and/or RF absorbent material positioned relative to a first portion of a tote such that an incoming RF signal does not pass through the first portion of the tote causing an RF outgoing signal, from an RFID inside the tote, to pass through the first portion of the tote for detection. In this way, an RF incoming signal can pass through the second portion of the tote to cause an RF outgoing signal from the RFID inside the tote to pass through the second portion of the tote for detection.

The RF reflective and/or RF absorbent material can be partially RF reflective and/or partially RF absorbent or can be fully RF reflective and/or fully RF absorbent, as needed for each application. In a specific embodiment, reflective and/or absorbent materials are positioned on the sides and the top of the closed tote. The materials can be provided with or without texture. The bottom, or a portion of the bottom, is left sufficiently free of RF reflective material and/or RF absorbent material, where sufficiently free of RF reflective material and/or RF absorbent material can be free of such material or can include only so much of such material that an outgoing RFID signal can be produced and can still pass through that portion of the body from inside the body to the outside of the body. In this way, RF signals pass through the bottom, or portion of the bottom, without reflective material so as to allow the reading of RFID tags in the tote. Advantages provided by embodiments of the invention include improving readability of RFID tags in a tote and offering a secured system during shipping since it is difficult, if not impossible, to read the contents of a package from certain positions relative to the tote. In a specific embodiment, the shape of the totes is designed, and the reflective and/or absorbent materials are distributed on the totes such that RF signals cannot directly enter a tote that is stacked on top of another tote. In an embodiment utilizing active and/or semi-active RF tags, which have a power supply to signal emissions, inside the tote, the reflective and/or absorbent materials can serve as a shield to avoid transmission of the signal outside of a tote that is stacked on top of another tote having the same design. Active and/or semi-active RF tags can emit continuously or in accordance with some other time pattern.

DETAILED DISCLOSURE

Embodiments of the present invention relate a method and apparatus for tracking transported items using RFID tags. In an embodiment, a tote for shipment of items, such as pharmaceutical products, that are tagged with RFID tags can be utilized. Embodiments of the subject invention provide a secure way of transporting pharmaceutical products between distribution centers and pharmacies using RFID tags and RFID readers. Using materials that are reflective and/or absorbent to RF signals on one or more of the six walls of the tote, it is possible to increase the readability of RFID tags inside the tote. A portion of the six walls of the tote can be sufficiently free of reflective and/or absorbent material to allow RF signals to be sent into, and exit, the tote. In a specific embodiment, at least partially reflective and/or at least partially absorbent material is positioned on the sides and the top of the closed tote. The bottom, or a portion of the bottom, is left sufficiently free of reflective and/or RF absorbent material, such that RF signals can pass through the bottom, or portion of the bottom, sufficiently free of RF reflective and/or RF absorbent material to allow the reading of RFID tags in the tote. The at least partially RF reflective and/or at least partially absorbent material can be provided on the sides of the tote with or without texture. The texture can take the form of any pattern, such as a grid, so long as where RF signals can pass or not is controlled.

In additional embodiments, at least a portion of the top of the closed tote is left sufficiently free of reflective and/or absorbent material, or at least a portion of one of the sides of the tote is left sufficiently free of RF reflective and/or absorbent material such that RF signals can pass through the portion of the top or side sufficiently free of reflective and/or absorbent material to allow the reading of RFID tags in the tote. Advantages provided by embodiments of the invention include improving readability of RFID tags in a tote and offering a secured system during shipping since it is difficult, if not impossible, to read the contents of a package from certain positions relative to the tote. In a specific embodiment, the shape of the totes is designed, and the reflective and/or absorbent materials are distributed on the totes such that RF signals cannot directly enter a tote that is stacked on top of another tote. For embodiments providing a side surface portion sufficiently free of RF reflective and/or RF absorbent materials, stacking totes next to each other can accomplish a similar security from RF signals.

In an embodiment utilizing active and/or semi-active RF tags, which have a power supply to signal emissions, inside the tote, the reflective and/or absorbent materials can serve as a shield to avoid transmission of the signal outside of a tote that is stacked on top of another tote having the same design. Active and/or semi-active RF tags can emit continuously or in accordance with some other time pattern.

Figure 1:
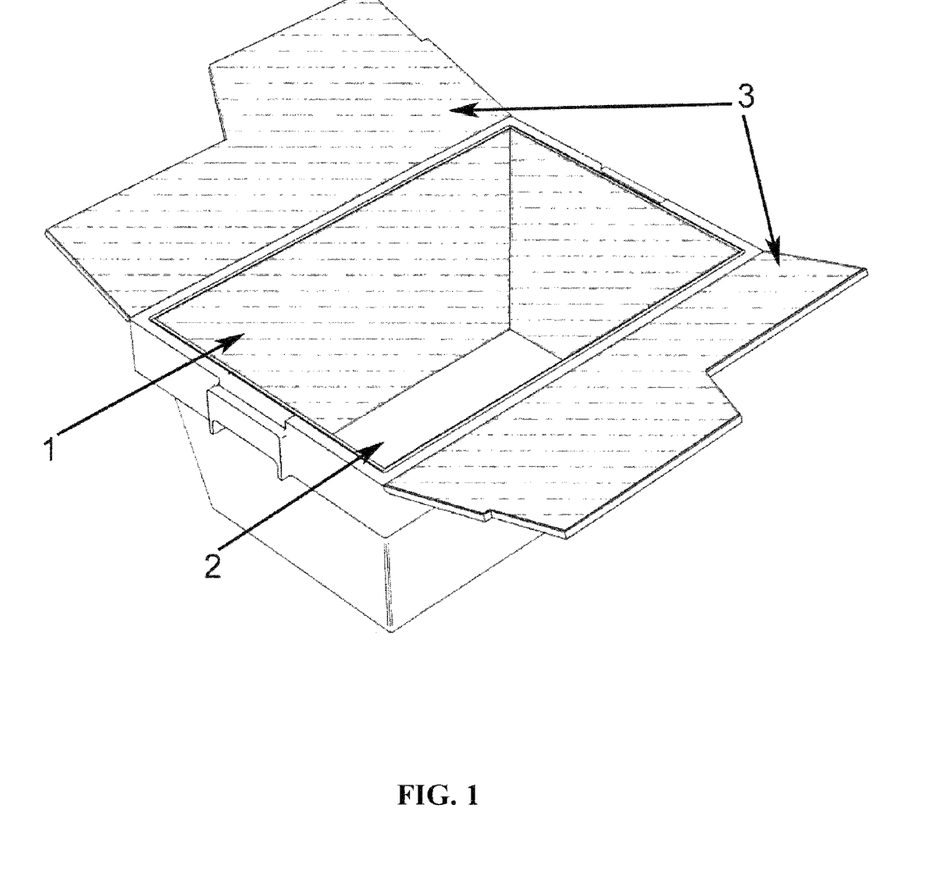
FIG. 1 shows an embodiment of a tote in accordance with the invention showing RF reflective and/or absorbent material located on the four sides of the tote and on the top flaps, which fold over to close the top of the tote.

Referring to FIG. 1, in one implementation of a tote for shipment of items, the interior side walls 1 of the tote can be coated with RF reflective and/or RF absorbent materials. The bottom 2 of the tote is left sufficiently free of RF reflective and/or RF absorbent material. In addition, the cover flaps 3 of this implementation of the tote can also be coated with the RF reflective and/or RF absorbent materials.

Figure 2:
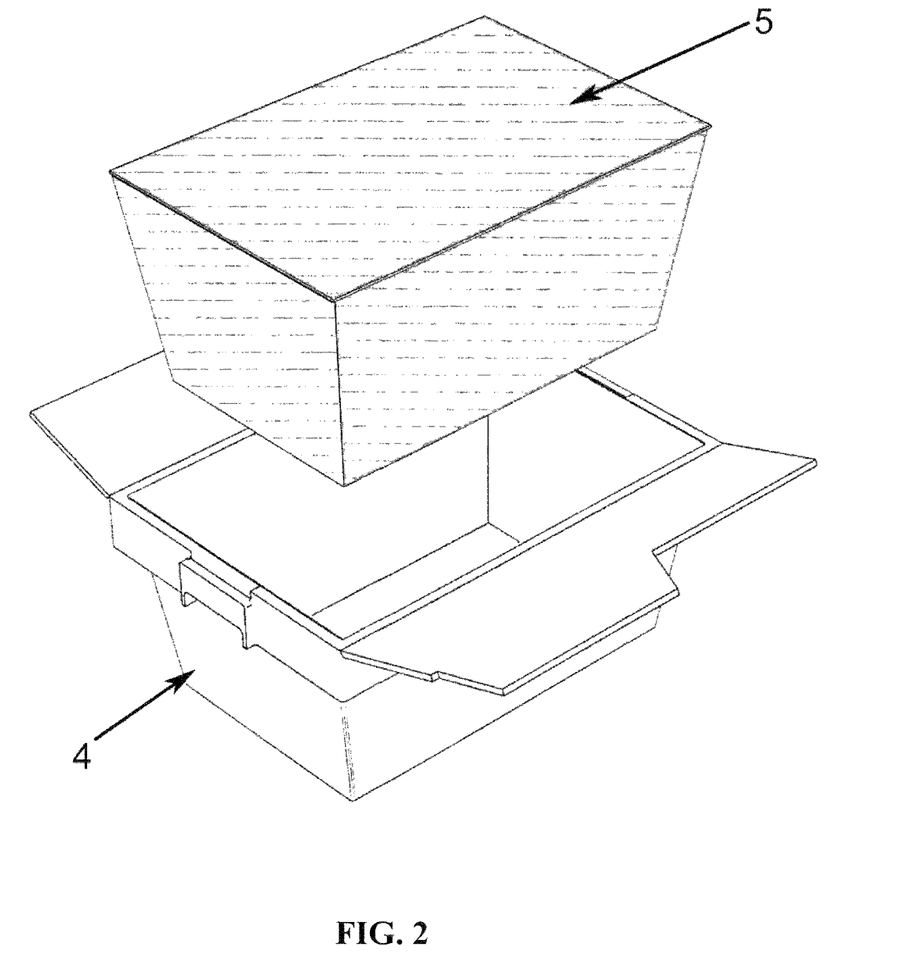
FIG. 2 shows an embodiment of a tote in accordance with the invention with the reflective and/or absorbent material coated on a sleeve lifted up from the body of the tote.

Referring to FIG. 2, the tote 4 having cover flaps can be free of RF reflective and/or RF absorbent materials. In such an embodiment, a sleeve 5 that is coated with the RF reflective and/or RF absorbent materials on all sides but the bottom can be used.

Figure 3:
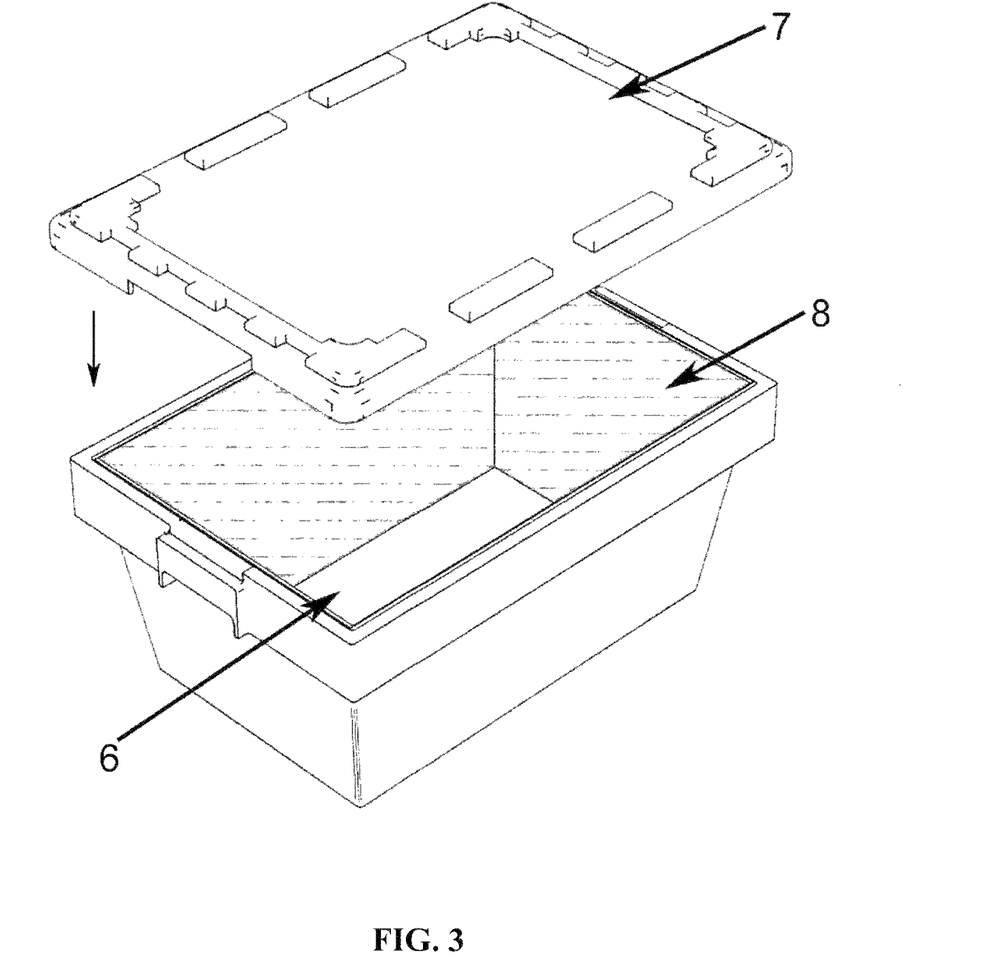
FIG. 3 shows an embodiment of a tote in accordance with the invention, four walls and the lid of which are coated with reflective and/or absorbent material.

Referring to FIG. 3, in another implementation of a tote for shipment of items, the bottom 6 of a tote is again left sufficiently free of RF reflective and/or RF absorbent material. The tote can have a lid 7 with RF reflective and/or RF absorbent material on its interior surface (not shown). The interior side walls 8 of the tote can be coated with RF reflective and/or RF absorbent materials.

Figure 4:
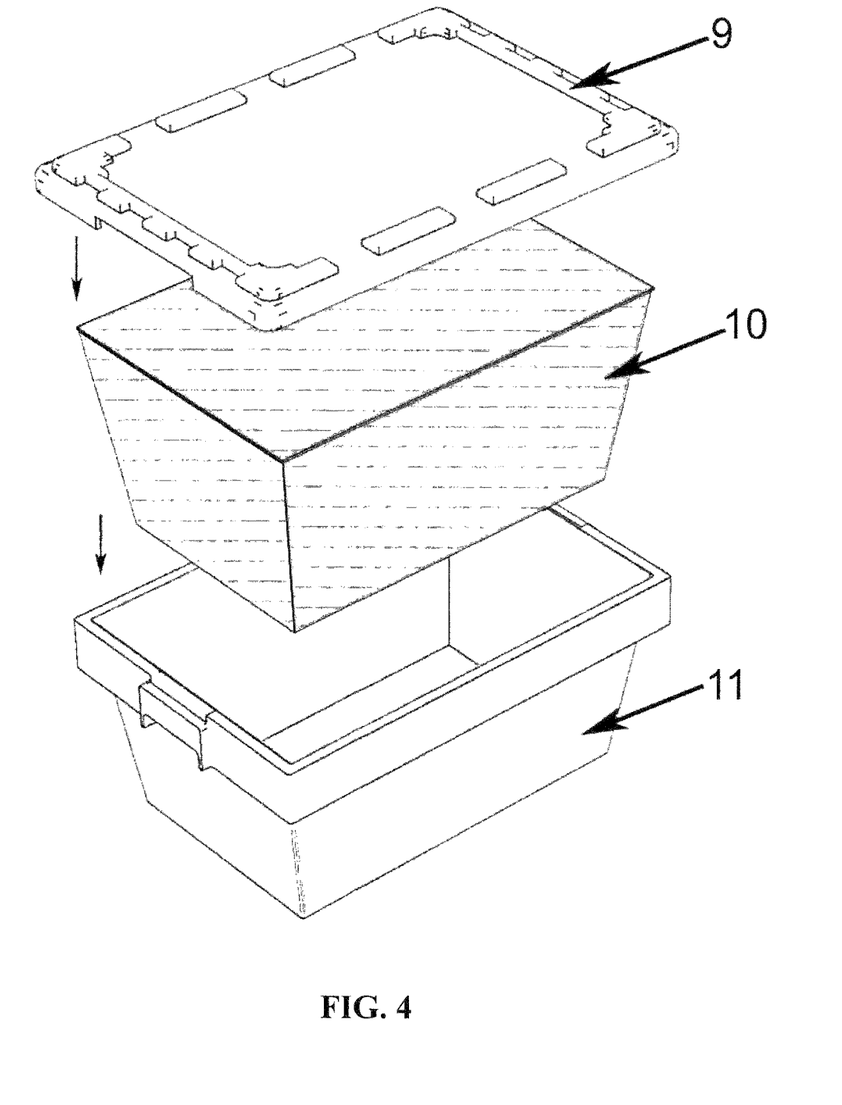
FIG. 4 shows an embodiment of a tote in accordance with the invention with a one piece top lid and an insert sleeve, five sides of which are coated with a reflective and/or absorbent material.

Referring to FIG. 4, the tote 11 having a lid 9 can be sufficiently free of RF reflective and/or RF absorbent materials. In such an embodiment, a sleeve 10 that is coated with the RF reflective and/or RF absorbent materials on all sides but the bottom can be used.

Figure 5:
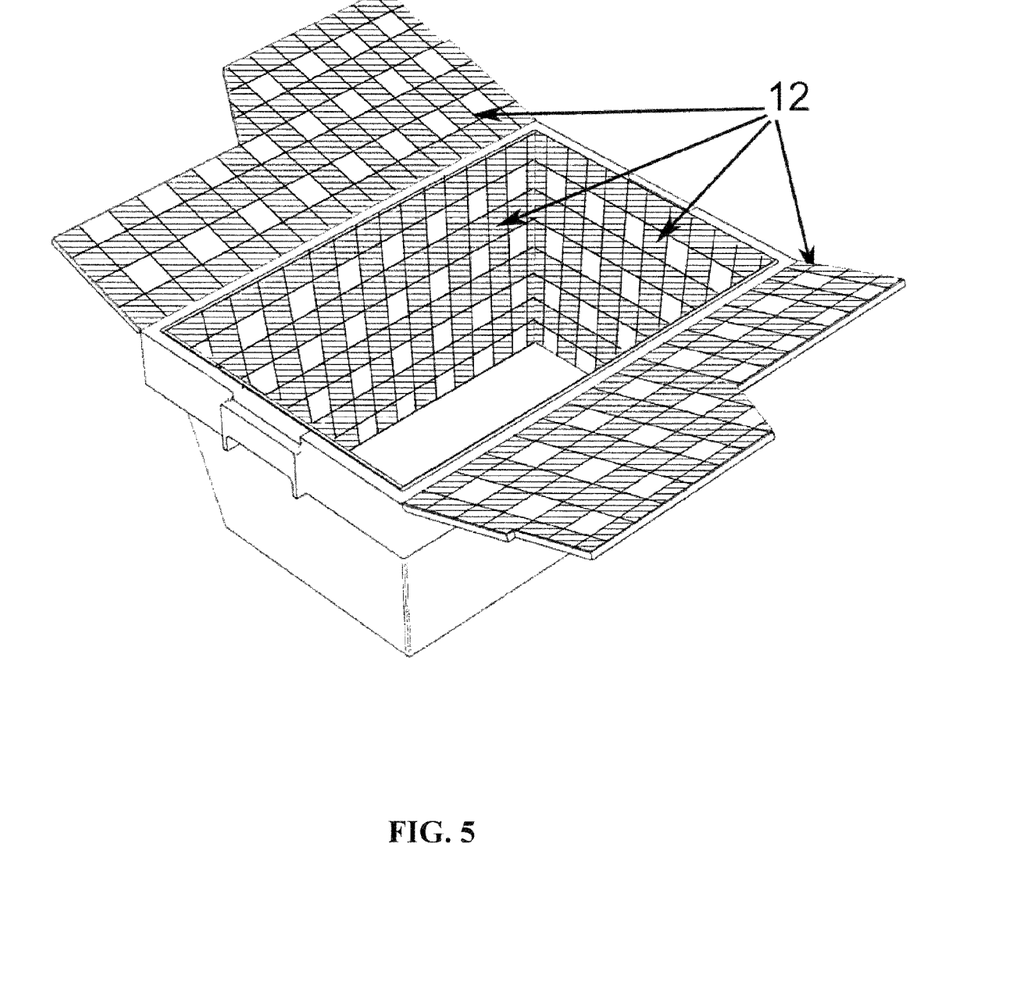
FIG. 5 shows an embodiment of a tote in accordance with the invention with a grid textured RF reflective and/or absorbent material located on five sides.

Although FIGS. 1-4 show RF reflective and/or RF absorbent materials provided without texture, such coated RF reflective and/or RF absorbent materials can be provided with texture in certain embodiments. For example, as shown in FIG. 5, the RF reflective and/or RF absorbent materials can be provided with texture. According to the embodiment shown in FIG. 5, the walls 12 of a tote can be coated with RF reflective and/or RF absorbent material with a grid texture.

Embodiments of the invention, as shown in FIGS. 1, 2, 3, 4, and 5, provide a tote and a secure way of transporting pharmaceutical products between distribution centers and pharmacies using RFID tags and tag readers. The tote incorporates RF reflective and/or RF absorbent material on the sides and top flaps or lid. This tote can alleviate the problem of readability of the RFID tags of each product in the tote. Using a material reflective and/or absorbent to RF signals on the four walls and the top flaps or lid, the readability of RFID tags located on product inside of the tote is increased significantly. The area without reflective and/or absorbent material, i.e., the bottom in the embodiments shown in FIGS. 1, 2, 34, and 5, is used to send the RF signals inside the tote.

Referring to the use of the tote shown in FIGS. 1, 2, 3, 4, and 5, at any point during distribution of the tagged items in the tote, it is possible to read the RFID tags in the tote by using a RF antenna/reader through the bottom area, which does not have reflective and/or absorbent material. Locating the area without reflective and/or absorbent material at the bottom can allow reading the RFID tags from the bottom without interfering with the packing process, (i.e., loading the tote and allows the tote content to be read on a conveyor belt with an antenna/RFID tag reader placed under the conveyor belt. Further, when the tote is stacked on a pallet or a truck it is difficult, if not impossible, to read the RFID tags in the tote with any RF devices. When the tote is received at the pharmacy, it is possible to verify the content of the tote by placing the tote flat on the counter over an RFID tag reader before opening. In a specific embodiment, a tote can have an open top and RF reflective and/or RF absorbent material on the bottom and sides such that RFID tags can be read from the top. Preferably, the totes with open tops can stack on each other without damaging the RFID tagged items inside the lower tote.

Figure 6:
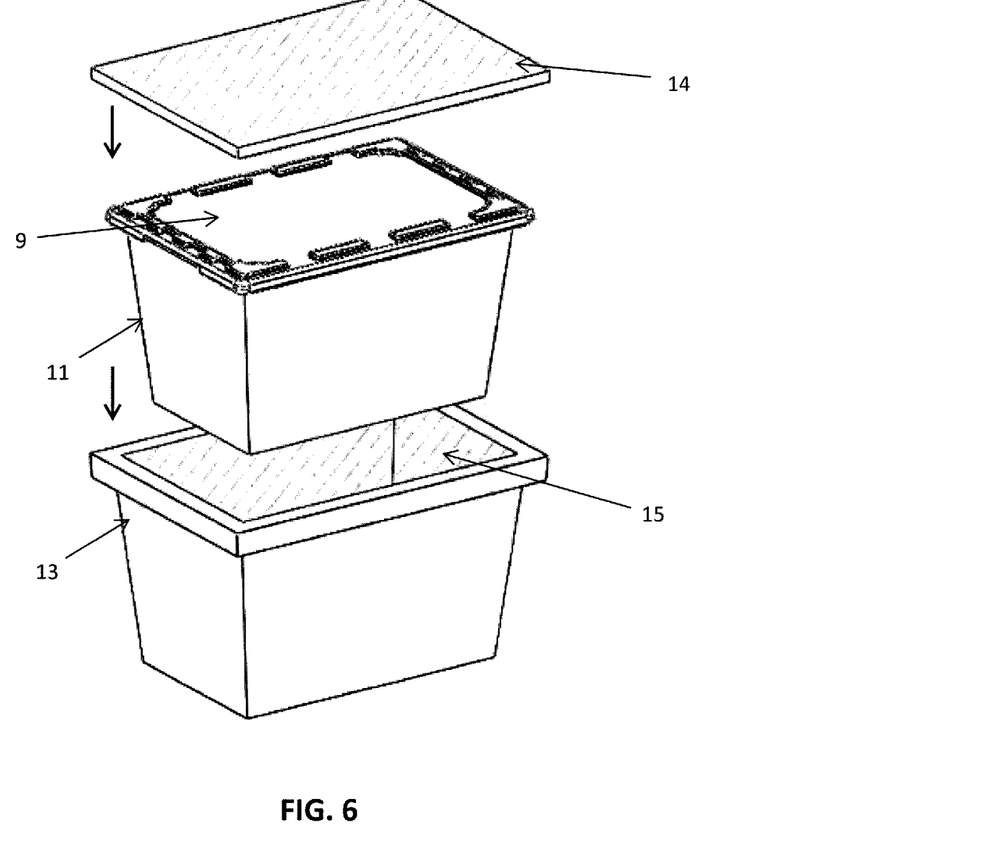
FIG. 6 shows an embodiment of a tote with a one piece cover, in accordance with the invention, and a sleeve having RF reflective and/or RF absorbent materials, in which the tote is positioned.

Using reflective and/or absorbent materials to enhance the readability of RFID tags within a tote is inexpensive and very effective. The use of the reflective and/or absorbent material can also offer a secured system during shipping since the angle and position for reading the content when the totes are stacked on top of each other can be controlled. Although the embodiments shown in FIGS. 2 and 4 have a removable sleeve (5, 10) for providing the RF reflective material, other embodiments can incorporate the RF reflective and/or absorbent material in other ways. Examples of the other ways to incorporate the RF reflective and/or absorbent material include: embedding the RF reflective and/or absorbent material in the body of the tote, coating the appropriate portions of the inside layer of the tote with RF reflective and/or absorbent material, coating the appropriate portions of the outside surface of the tote with RF reflective and/or absorbent material, and utilizing an outer sleeve having RF reflective and/or absorbent material in which the tote can be placed. Referring to FIG. 6, a tote 11 having a lid 9 free of RF reflective and/or RF absorbent materials, a sleeve 13 having RF reflective and/or RF absorbent materials on all sides but the bottom, and a sleeve cover 14 having RF reflective and/or absorbent materials can be used, such that the tote 11 with cover 9 can be positioned in the sleeve 13 with cover 14. In an alternative embodiment, referring to FIG. 6, the tote 4 of FIG. 2 having cover flaps free of RF reflective and/or RF absorbent materials, rather than tote 11 of FIG. 6, can be positioned in the sleeve 13 with cover 14. By using a sleeve with RF reflective and/or absorbent material inside or outside of the tote, the sleeve can be used with existing totes, can be removed when desired, and can be interchanged with other sleeves.

An embodiment of the invention relates to a method and system for transporting RFID tagged items incorporating one or more totes as described in the subject application and a means for reading the RFID tags of the items when placed in the one or more totes. A specific embodiment utilizes a plurality of totes, an RFID tag reader and RFID tags placed on items to be stored and/or transported. The means for reading the RFID tags can utilize an RFID reader located under the tote when the tote is on, for example, a conveyer belt or counter, or located to read the RFID tag as the tote is being transported, through the portion of the free of RF reflective and/or absorbent material.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A tote, comprising:
   a body,
   wherein the body is configured to enclose two or more RFID tagged items, and
   wherein two or more RFID tagged items are enclosed within the body; and
   at least partially RF reflective and/or at least partially RF absorbent material positioned relative to a first portion of the body such that:
   (i) the at least partially RF reflective and/or at least partially RF absorbent material positioned relative to the first portion of the body prevents a corresponding two or more outgoing RFID signals from the two or more RFID tagged items enclosed within the body from passing through the first portion of the body to outside the tote, and
   (ii) the at least partially RF reflective and/or at least partially RF absorbent material positioned relative to the first portion of the body does not prevent the corresponding two or more outgoing RFID signals from the two or more RFID tagged items enclosed within the body from passing through a second portion of the body to outside the tote,
   wherein the tote allows the passage of RF signals from outside the tote through the second portion of the body to the two or more RFID tagged items enclosed within the body so as to cause the corresponding two or more outgoing RFID signals from the two or more RFID tagged items enclosed within the body to pass through the second portion of the body to outside the tote,
   wherein the second portion of the body is at least a portion of a bottom of the body, and
   wherein the first portion of the body is the entire body except for the at least a portion of the bottom of the body.

2. The tote according to claim 1,
   wherein the at least partially RF reflective and/or at least partially RF absorbent material prevents the corresponding two or more outgoing RFID signals from the two or more RFID tagged items enclosed within the body from passing through the first portion of the body to outside the tote by preventing RF signals from reaching the two or more RFID tagged items enclosed within the body from outside the tote through the first portion of the body and causing the corresponding two or more outgoing RFID signals from the two or more RFID tagged items enclosed within the body to pass through the first portion of the body to outside the tote.

3. The tote according to claim 2,
   wherein the at least partially RF reflective and/or at least partially RF absorbent material prevents RF signals from reaching the two or more RFID tagged items enclosed within the body from outside the tote through the first portion of the body.

4. The tote according to claim 1,
   wherein the second portion of the body is the bottom of the body.

5. The tote according to claim 1,
   wherein the first portion of the body comprises:
   a top; and
   four sides of the body.

6. The tote according to claim 1,
   wherein the at least partially RF reflective and/or at least partially RF absorbent material is provided with texture.

7. The tote according to claim 6,
   wherein the texture comprises a grid pattern.

8. The tote according to claim 1,
   wherein the two or more RFID tagged items enclosed within the body are two or more semi-active RFID tagged items.

9. The tote according to claim 1,
   wherein the two or more RFID tagged items enclosed within the body are two or more active RFID tagged items.

10. A method of storing and/or transporting two or more RFID tagged items, comprising:
    providing a tote according to claim 1; and
    reading a corresponding two or more RFID tags of the two or more RFID tagged items from outside the tote.

11. The method according to claim 10,
    wherein the at least partially RF reflective and/or at least partially RF absorbent material is embedded in the first portion of the body.

12. The method according to claim 10,
    wherein the at least partially RF reflective and/or at least partially RF absorbent material is provided with texture.

13. The method according to claim 12,
    wherein the texture comprises a grid pattern.

14. The method according to claim 10,
    wherein the two or more RFID tagged items enclosed within the body are two or more semi-active RFID tagged items.

15. The method according to claim 10,
    wherein the two or more RFID tagged items enclosed within the body are two or more active RFID tagged items.

16. The method according to claim 10,
    wherein the at least partially RF reflective and/or at least partially RF absorbent material is at least partially RF reflective.

17. The method according to claim 10,
wherein the at least partially RF reflective and/or at least partially RF absorbent material is at least partially RF absorbent.
18. The method according to claim 10,
wherein the at least partially RF reflective and/or at least partially RF absorbent material is fully RF reflective.
19. The method according to claim 10,
wherein the at least partially RF reflective and/or at least partially RF absorbent material is fully RF absorbent.
20. The method according to claim 10,
wherein the at least partially RF reflective and/or at least partially RF absorbent material is positioned on the first portion of the body.
21. The method according to claim 10,
wherein a top of the body comprises a pair of flaps.
22. The method according to claim 10,
wherein a top of the body comprises a lid.
23. The tote according to claim 1,
wherein the at least partially RF reflective and/or at least partially RF absorbent material is at least partially RF reflective.
24. The tote according to claim 1,
wherein the at least partially RF reflective and/or at least partially RF absorbent material is at least partially RF absorbent.
25. The tote according to claim 1,
wherein the at least partially RF reflective and/or at least partially RF absorbent material is fully RF reflective.
26. The tote according to claim 1,
wherein the at least partially RF reflective and/or at least partially RF absorbent material is fully RF absorbent.
27. The tote according to claim 1,
wherein the at least partially RF reflective and/or at least partially RF absorbent material is positioned on the first portion of the body.
28. The tote according to claim 1,
wherein the at least partially RF reflective and/or at least partially RF absorbent material is embedded in the first portion of the body.
29. The tote according to claim 1,
wherein a top of the body comprises a pair of flaps.
30. The tote according to claim 1,
wherein a top of the body comprises a lid.
31. A tote, comprising:
a body,
wherein the body is configured to enclose two or more RFID tagged items, and
wherein two or more RFID tagged items are enclosed within the body; and
at least partially RF reflective and/or at least partially RF absorbent material positioned relative to a first portion of the body such that:
  (i) the at least partially RF reflective and/or at least partially RF absorbent material positioned relative to the first portion of the body prevents a corresponding two or more outgoing RFID signals from two or more RFID tagged items enclosed within the body from passing through the first portion of the body to outside the tote, and
  (ii) the at least partially RF reflective and/or at least partially RF absorbent material positioned relative to the first portion of the body does not prevent the corresponding two or more outgoing RFID signals from the two or more RFID tagged items enclosed within the body from passing through a second portion of the body to outside the tote,
wherein the tote allows the passage of RF signals from outside the tote through the second portion of the body to the two or more RFID tagged items enclosed within the body so as to cause the corresponding two or more outgoing RFID signals from the two or more RFID tagged items enclosed within the body to pass through the second portion of the body to outside the tote,
wherein the second portion of the body is at least a portion of a side of the body, and
wherein the first portion of the body is the entire body except for the at least a portion of the side of the body.
32. The tote according to claim 31,
wherein upon placing the tote adjacent to the second tote, the second tote prevents RF signals from outside the tote from passing through the at least a portion of the side of the body to the two or more RFID tagged items enclosed within the body.
33. A method of storing and/or transporting two or more RFID tagged items, comprising:
providing a tote according to claim 31; and
reading a corresponding two or more RFID tags of the two or more RFID tagged items from outside the tote.
34. The method according to claim 33, further comprises:
placing the tote adjacent to a second tote that is identical to the tote with the same orientation such that the at least a portion of the side is adjacent the second tote,
wherein upon placing the tote adjacent to a second tote that is identical to the tote with the same orientation such that the at least a portion of the side is adjacent the second tote, the second tote prevents RF signals from outside the tote from passing through the at least a portion of the side of the body to the two or more RFID tagged items enclosed within the body and causing the corresponding two or more outgoing RFID signals from the two or more RFID tagged items enclosed within the body to pass through the at least a portion of the side of the body to outside the tote.
35. The method according to claim 34,
wherein upon placing the tote adjacent to the second tote, the second tote prevents RF signals from outside the tote from passing through the at least a portion of the side of the body to the two or more RFID tagged items enclosed within the body.
36. The method according to claim 33,
wherein the second portion of the body is the side of the body.
37. The tote according to claim 31,
wherein the second portion of the body is the side of the body.
38. A tote, comprising:
a body,
wherein the body is configured to enclose two or more RFID tagged items; and
at least partially RF reflective and/or at least partially RF absorbent material positioned relative to a first portion of the body such that when two or more RFID tagged items are enclosed within the body:
  (i) the at least partially RF reflective and/or at least partially RF absorbent material positioned relative to the first portion of the body prevents a corresponding two or more outgoing RFID signals from the two or more RFID tagged items enclosed within the body from passing through the first portion of the body to outside the tote, and
  (ii) the at least partially RF reflective and/or at least partially RF absorbent material positioned relative to the first portion of the body does not prevent the corresponding two or more outgoing RFID signals from the two or more RFID tagged items enclosed within the body from passing through a second portion of the body to outside the tote, wherein the tote allows the passage of RF signals from outside the tote through the second portion of the body to the two or more RFID tagged items enclosed within the body so as to cause the corresponding two or more outgoing RFID signals from the two or more RFID tagged items enclosed within the body to pass through the second portion of the body to outside the tote, wherein the second portion of the body is at least a portion of a bottom of the body, wherein the first portion of the body is the entire body except for the at least a portion of the bottom of the body, and wherein upon stacking the tote on a second tote that is identical to the tote, the second tote prevents RF signals from outside the tote from passing through the bottom of the body to the two or more RFID tagged items enclosed within the body and causing the corresponding two or more outgoing RFID signals from the two or more RFID tagged items enclosed within the body to pass through the bottom of the body to outside the tote.

39. The tote according to claim 38, wherein upon stacking the tote on the second tote, the second tote prevents RF signals from outside the tote from passing through the bottom of the body to the two or more RFID tagged items enclosed within the body.

40. A method of storing and/or transporting two or more RFID tagged items, comprising:

enclosing two or more RFID tagged items within a tote according to claim 38; and stacking the tote on a second tote that is identical to the tote.

41. The method according to claim 40, wherein the second portion of the body is the bottom of the body.

42. The method according to claim 40, wherein the first portion of the body comprises a top and four sides of the body.

43. A tote, comprising:

a body, wherein the body is configured to enclose two or more RFID tagged items, and wherein two or more tagged items are enclosed within the body; and at least partially RF reflective and/or at least partially RF absorbent material positioned relative to a first portion of the body such that:

(i) the at least partially RF reflective and/or at least partially RF absorbent material positioned relative to the first portion of the body prevents a corresponding two or more outgoing RFID signals from the two or more RFID tagged items enclosed within the body from passing through the first portion of the body to outside the tote, and (ii) the at least partially RF reflective and/or at least partially RF absorbent material positioned relative to the first portion of the body does not prevent the corresponding two or more outgoing RFID signals from the two or more RFID tagged items enclosed within the body from passing through a second portion of the body to outside the tote, wherein the tote allows the passage of RF signals from outside the tote through the second portion of the body to the two or more RFID tagged items enclosed within the body so as to cause the corresponding two or more outgoing RFID signals from the two or more RFID tagged items enclosed within the body to pass through the second portion of the body to outside the tote, wherein the second portion of the body is at least a portion of a top of the body, wherein the first portion of the body is the entire body except for the at least a portion of the top of the body, and wherein upon stacking a second tote on the tote that is identical to the tote, the second tote prevents RF signals from outside the tote from passing through the top of the body to the two or more RFID tagged items enclosed within the body and causing the corresponding two or more RFID outgoing signals from the two or more RFID tagged items enclosed within the body to pass through the top of the body to outside the tote.

44. The tote according to claim 43, wherein upon stacking the second tote on the tote, the second tote prevents RF signals from outside the tote from passing through the top of the body to the two or more RFID tagged items enclosed within the body.

45. The tote according to claim 43, wherein the second portion of the body is the top of the body.

46. A method of storing and/or transporting two or more RFID tagged items, comprising:

providing a tote according to claim 43; and stacking a second tote that is identical to the tote on the tote.

47. The method according to claim 46, wherein upon stacking the second tote on the tote, the second tote prevents RF signals from outside the tote from passing through the top of the body to the two or more RFID tagged items enclosed within the body.

48. The method according to claim 46, wherein the second portion of the body is the top of the body.

49. A tote, comprising:

a body, wherein the body is configured to enclose two or more RFID tagged items, and wherein two or more RFID tagged items are enclosed within the body; and at least partially RF reflective and/or at least partially RF absorbent material positioned relative to a first portion of the body such that:

(i) the at least partially RF reflective and/or at least partially RF absorbent material positioned relative to the first portion of the body prevents a corresponding two or more outgoing RFID signals from the two or more RFID tagged items enclosed within the body from passing through the first portion of the body to outside the tote, and (ii) the at least partially RF reflective and/or at least partially RF absorbent material positioned relative to the first portion of the body does not prevent the corresponding two or more outgoing RFID signals from the two or more RFID tagged items enclosed within the body from passing through the second portion of the body to outside the tote, wherein the tote allows the passage of RF signals from outside the tote through the second portion of the body to the two or more RFID tagged items enclosed within the body so as to cause the corresponding two or more outgoing RFID signals from the two or more RFID tagged items enclosed within the body to pass through the second portion of the body to outside the tote, wherein:
- (i) the second portion of the body is at least a portion of a bottom of the body, and the first portion of the body is the entire body except for the at least a portion of the bottom of the body,
- (ii) the second portion of the body is at least a portion of a side of the body, and the first portion of the body is the entire body except for the at least a portion of the side of the body, or
- (iii) the second portion of the body is at least a portion of a top of the body, and the first portion of the body is the entire body except for the at least a portion of the top of the body, wherein the at least partially RF reflective and/or at least partially RF absorbent material is either:
- (i) only coated onto an inside surface of the first portion of the body, or
- (ii) only coated on an outside surface of the first portion of the body, and wherein the first portion of the body does not prevent the corresponding two or more outgoing RFID signals from the two or more RFID tagged items enclosed within the body from passing through the first portion of the body to outside the tote.

50. The tote according to claim 49, wherein the at least partially RF reflective and/or at least partially RF absorbent material is only coated onto an inside surface of the first portion of the body.

51. The tote according to claim 49, wherein the at least partially RF reflective and/or at least partially RF absorbent material is only coated onto an outside surface of the first portion of the body.

52. A method of storing and/or transporting two or more RFID tagged items, comprising:
providing a tote according to claim 49; and,
reading a corresponding two or more RFID tags of the two or more RFID tagged items from outside the tote.

53. The method according to claim 52, wherein the at least partially RF reflective and/or at least partially RF absorbent material is only coated onto an inside surface of the first portion of the body.

54. The method according to claim 52, wherein the at least partially RF reflective and/or at least partially RF absorbent material is only coated onto an outside surface of the first portion of the body.

55. A tote, comprising:
a body,
wherein the body is configured to enclose two or more RFID tagged items, and
wherein two or more RFID tagged items are enclosed within the body; and
a sleeve,
wherein the sleeve comprises:
at least partially RF reflective and/or at least partially RF absorbent material, wherein the sleeve is positioned in a first position relative to the body such that:
- (i) the sleeve prevents a corresponding two or more outgoing RFID signals from the two or more RFID tagged items enclosed within the body from passing through a first portion of the body to outside the tote, and
- (ii) the sleeve does not prevent the corresponding two or more outgoing RFID signals from the two or more RFID tagged items enclosed within the body from passing through a second portion of the body to outside the tote, wherein the tote allows the passage of RF signals from outside the tote through the second portion of the body to the two or more RFID tagged items enclosed within the body so as to cause the corresponding two or more outgoing RFID signals from the two or more RFID tagged items to pass through the second portion of the body to outside the tote, wherein the sleeve is configured to be positioned in a second position relative to the body such that:
- (i) the sleeve does not prevent the corresponding two or more outgoing RFID signals from the two or more RFID tagged items enclosed within the body from passing through the first portion of the body to outside the tote, and
- (ii) the sleeve does not prevent corresponding two or more outgoing RFID signals from the two or more RFID tagged items enclosed within the body from passing through the second portion of the body to outside the tote.

56. The tote according to claim 55, wherein the sleeve positioned in the first position is positioned relative to the body such that the body is positioned in the sleeve.

57. A method of storing and/or transporting two or more RFID tagged items, comprising:
providing a tote according to claim 55;
positioning the sleeve in the first position relative to the body; and
reading a corresponding two or more RFID tags of the two or more RFID tagged items from outside the tote.

58. The method according to claim 57, wherein when the sleeve is positioned in the first position the sleeve is positioned in the body.

59. The method according to claim 57, wherein when the sleeve is positioned in the first position the body is positioned in the sleeve.

60. The method according to claim 57, wherein the second portion of the body is at least a portion of the bottom of the body.

61. The method according to claim 60, wherein the second portion of the body is the bottom of the body.

62. The method according to claim 57, wherein the second portion of the body is at least a portion of the top of the body.

63. The method according to claim 62, wherein the second portion of the body is the top of the body.

64. The method according to claim 57, wherein the second portion of the body is at least a portion of a side of the body.

65. The method according to claim 64, wherein the second portion of the body is the side of the body.

66. The tote according to claim 55, wherein the sleeve positioned in the first position is positioned relative to the body such that the sleeve is positioned in the body.

67. The tote according to claim 55, wherein the second portion of the body is at least a portion of the bottom of the body.

68. The tote according to claim 67, wherein the second portion of the body is the bottom of the body.

69. The tote according to claim 55,
wherein the second portion of the body is at least a portion of the top of the body.

70. The tote according to claim 69,
wherein the second portion of the body is the top of the body.

71. The tote according to claim 55,
wherein the second portion of the body is at least a portion of a side of the body.

72. The tote according to claim 71,
wherein the second portion of the body is the side of the body.

73. The tote according to claim 55,
wherein the at least partially RF reflective and/or at least partially RF absorbent material is provided with texture.

74. The tote according to claim 73,
wherein the texture comprises a grid pattern.

75. The tote according to claim 55,
wherein the at least partially RF reflective and/or at least partially RF absorbent material is at least partially RF reflective.

76. The tote according to claim 55,
wherein the at least partially RF reflective and/or at least partially RF absorbent material is at least partially RF absorbent.

77. The tote according to claim 55,
wherein the at least partially RF reflective and/or at least partially RF absorbent material is fully RF reflective.

78. The tote according to claim 55,
wherein the at least partially RF reflective and/or at least partially RF absorbent material is fully RF absorbent.

79. The tote according to claim 55,
wherein the at least partially RF reflective and/or at least partially RF absorbent material is positioned on the sleeve.

80. The tote according to claim 55,
wherein the at least partially RF reflective and/or at least partially RF absorbent material is embedded in the sleeve.

81. The tote according to claim 55,
wherein a top of the body comprises a pair of flaps.

82. The tote according to claim 55,
wherein a top of the body comprises a lid.

* * * * *

UNITED STATES PATENT AND TRADEMARK OFFICE
CERTIFICATE OF CORRECTION

PATENT NO. : 9,449,266 B2
APPLICATION NO. : 12/593934
DATED : September 20, 2016
INVENTOR(S) : Jean-Pierre Emond, Dilek Dagdelen Uysal and Jeffrey Lane Wells

Page 1 of 1

It is certified that error appears in the above-identified patent and that said Letters Patent is hereby corrected as shown below:

On the Title Page

"(73) Assignee: UNIVERSITY OF FLORIDA RESEARCH FOUNDATION, INC., Gainesville, FL (US)" should read --(73) Assignee: UNIVERSITY OF FLORIDA RESEARCH FOUNDATION, INC., Gainesville, FL (US); FRANWELL, INC., Gainesville, FL (US)--.

Signed and Sealed this
Twentieth Day of November, 2018

Andrei Iancu
*Director of the United States Patent and Trademark Office*